United States Patent
Li et al.

(10) Patent No.: US 8,214,215 B2
(45) Date of Patent: Jul. 3, 2012

(54) PHASE SENSITIVE MODEL ADAPTATION FOR NOISY SPEECH RECOGNITION

(75) Inventors: Jinyu Li, Redmond, WA (US); Li Deng, Redmond, WA (US); Dong Yu, Kirkland, WA (US); Yifan Gong, Sammamish, WA (US); Alejandro Acero, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 921 days.

(21) Appl. No.: 12/236,530

(22) Filed: Sep. 24, 2008

(65) Prior Publication Data

US 2010/0076758 A1    Mar. 25, 2010

(51) Int. Cl.
    *G10L 15/14*    (2006.01)
(52) U.S. Cl. .................. 704/256; 704/233; 704/226
(58) Field of Classification Search .......... 704/226, 704/233, 242–245, 256.1, 250–257
See application file for complete search history.

(56) References Cited

U.S. PATENT DOCUMENTS

| | | | |
|---|---|---|---|
| 5,727,124 A * | 3/1998 | Lee et al. ................ | 704/233 |
| 5,924,065 A | 7/1999 | Eberman et al. | |
| 6,026,359 A | 2/2000 | Yamaguchi et al. | |
| 6,691,091 B1 | 2/2004 | Cerisara et al. | |
| 7,047,047 B2 | 5/2006 | Acero et al. | |
| 7,165,026 B2 | 1/2007 | Acero et al. | |
| 7,165,028 B2 | 1/2007 | Gong | |
| 7,236,930 B2 * | 6/2007 | Bernard et al. .......... | 704/233 |
| 2002/0173959 A1 * | 11/2002 | Gong .................... | 704/256 |
| 2003/0115055 A1 * | 6/2003 | Gong .................... | 704/233 |
| 2006/0053008 A1 | 3/2006 | Droppo et al. | |
| 2007/0033027 A1 * | 2/2007 | Yao ...................... | 704/233 |
| 2007/0033028 A1 * | 2/2007 | Yao ...................... | 704/233 |
| 2007/0033034 A1 * | 2/2007 | Yao ...................... | 704/244 |
| 2007/0055508 A1 | 3/2007 | Zhao et al. | |
| 2008/0300875 A1 * | 12/2008 | Yao et al. .............. | 704/236 |

OTHER PUBLICATIONS

Stouten, et al., "Effect of Phase-Sensitive Environment Model and Higher Order VTS on Noisy Speech Feature Enhancement", retrieved at <<www.esat.kuleuven.be/psi/spraak/cgi-bin/get_file.cgi?/vstouten/icassp05/stouten.pdf>>, ICASSP 2005, pp. 433-436.

Om D. Deshmukh, "Synergy of Acoustic-Phonetics and Auditory Modeling towards Robust Speech Recognition", retrieved at <<https://drum.umd.edu/dspace/bitstream/1903/3952/1/umi-umd-3832.pdf>>, pp. 180.

Deng, et al., "Log-Domain Speech Feature Enhancement Using Sequential Map Noise Estimation and a Phase-Sensitive Model of the Acoustic Environment", retrieved at <<http://research.microsoft.com/srg/papers/2002-deng-icslpb.pdf>>, pp. 1813-1816.

(Continued)

*Primary Examiner* — Abul Azad

(57) ABSTRACT

A speech recognition system described herein includes a receiver component that receives a distorted speech utterance. The speech recognition also includes an updater component that is in communication with a first model and a second model, wherein the updater component automatically updates parameters of the second model based at least in part upon joint estimates of additive and convolutive distortions output by the first model, wherein the joint estimates of additive and convolutive distortions are estimates of distortions based on a phase-sensitive model in the speech utterance received by the receiver component. Further, distortions other than additive and convolutive distortions, including other stationary and nonstationary sources, can also be estimated used to update the parameters of the second model.

19 Claims, 8 Drawing Sheets

OTHER PUBLICATIONS

Afify, et al., "A General Joint Additive and Convolutive Bias Compensation Approach Applied to Noisy Lombard Speech Recognition", IEEE Transactions on Speech and Audio Processing, vol. 6, No. 6, Nov. 1998, pp. 524-538.

Zhu, et al., "Non-Linear Feature Extraction for Robust Speech Recognition in Stationary and Non-Stationary Noise", Computer Speech and Language, retrieved at <<http://www.ee.ucla.edu/~spapl/paper/zqf_cs103.pdf>>, 2003, pp. 381-402.

Y. Gong, "A Method of Joint Compensation of Additive and Convolutive Distortions for Speaker-Independent Speech Recognition", IEEE Transactions on Speech and Audio Processing, vol. 13, No. 5, Sep. 2005, pp. 975-983.

Kim, et al., "Speech Recognition in Noisy Environments Using First Order Vector Taylor Series", Speech Communication, retrieved at <<http://citeseer.ist.psu.edu/cache/papers/cs/3377/http:zSzzSzwww.dcs.shef.ac.ukzSz~ljupcozSzpaperszSzSC24-Kim-891.pdf/kim98speech.pdf, 1998, pp. 39-49.

Pedro J. Moreno, "Speech Recognition in Noisy Environments", retrieved at <<http://www.cs.cmu.edu/~robust/Thesis/pjm_thesis.pdf>>, Apr. 22, 1996, pp. 130.

Acero, et al., "HMM Adaptation Using Vector Taylor Series for Noisy Speech Recognition", retrieved at <<http://www.ee.columbia.edu/~dpwe/LabROSA/proceeds/icslp/2000/pdf/01165.pdf>>, pp. 4.

Li, et al., "High-Performance HMM Adaptation with Joint Compensation of Additive and Convolutive Distortions via Vector Taylor Series", retrieved at <<http://ieeexplore.ieee.org/iel5/4430067/4430068/04430085.pdf?tp=&isnumber=4430068&arnumber=4430085>>, pp. 65-70.

Deng, et al., "Enhancement of Log Mel Power Spectra of Speech Using a Phase-Sensitive Model of the Acoustic Environment and Sequential Estimation of the Corrupting Noise", IEEE Transactions on Speech and Audio Processing, vol. 12, No. 2, Mar. 2004, pp. 133-143.

Pearce, et al., "The Aurora Experimental Framework for the Performance Evaluation of Speech Recognition Systems under Noisy Conditions", retrieved at <<http://www.ee.columbia.edu/In/labrosa/proceeds/icslp/2000/pdf/00731.pdf>>, pp. 4.

Li Deng, "Roles of High-Fidelity Acoustic Modeling in Robust Speech Recognition", <<retrieved at http://ieeexplore.ieee.org/iel5/4430067/4430068/04430075.pdf?tp=&isnumber=4430068&arnumber=4430075>>, ASRTU, 2007, pp. 1-13.

* cited by examiner

PHASE SENSITIVE MODEL ADAPTATION FOR NOISY SPEECH RECOGNITION

BACKGROUND

Speech recognition has been the subject of a significant amount of research and commercial development. For example, speech recognition systems have been incorporated into mobile telephones, desktop computers, automobiles, and the like in order to provide a particular response to speech input provided by a user. For instance, in a mobile telephone equipped with speech recognition technology, a user can speak a name of a contact listed in the mobile telephone and the mobile telephone can initiate a call to the contact. Furthermore, many companies are currently using speech recognition technology to aid customers in connection with identifying employees of a company, identifying problems with a product or service, etc.

While speech recognition technology has improved over the last several years, effectively recognizing speech of an individual when the individual is in a relatively noisy environment remains difficult. For instance, a speech recognition system in a mobile telephone may not properly detect speech of a user if the user is in a relatively noisy environment. Further, there are at least two types of noise that can be taken into account by speech recognition systems: additive and convolutive noise. In many conventional speech recognition systems, these two types of noise have been handled independently, which may result in sub-optimal speech recognition.

SUMMARY

The following is a brief summary of subject matter that is described in greater detail herein. This summary is not intended to be limiting as to the scope of the claims.

Described herein are various technologies pertaining to speech recognition. In an example, a speech utterance may include additive distortions as well as convolutive distortions. As described in detail below, a first model can be used to jointly model both additive and convolutive distortions in uttered speech. Pursuant to an example, the first model can be a nonlinear, phase-sensitive model, wherein output of the model can be linearized, for instance, through use of a first order vector Taylor series approximation.

Based at least in part upon output from the first model, parameters of a second model used to recognize speech can be updated, and the second model can be used in connection with recognizing content in a received speech utterance. For instance, the second model can be a Hidden Markov Model that can be used in connection with a speech recognition system. For instance, the Hidden Markov Model can be adapted for use in a mobile device, a customer service application, a desktop computer, and/or the like.

Other aspects will be appreciated upon reading and understanding the attached figures and description.

DETAILED DESCRIPTION

Figure 1:
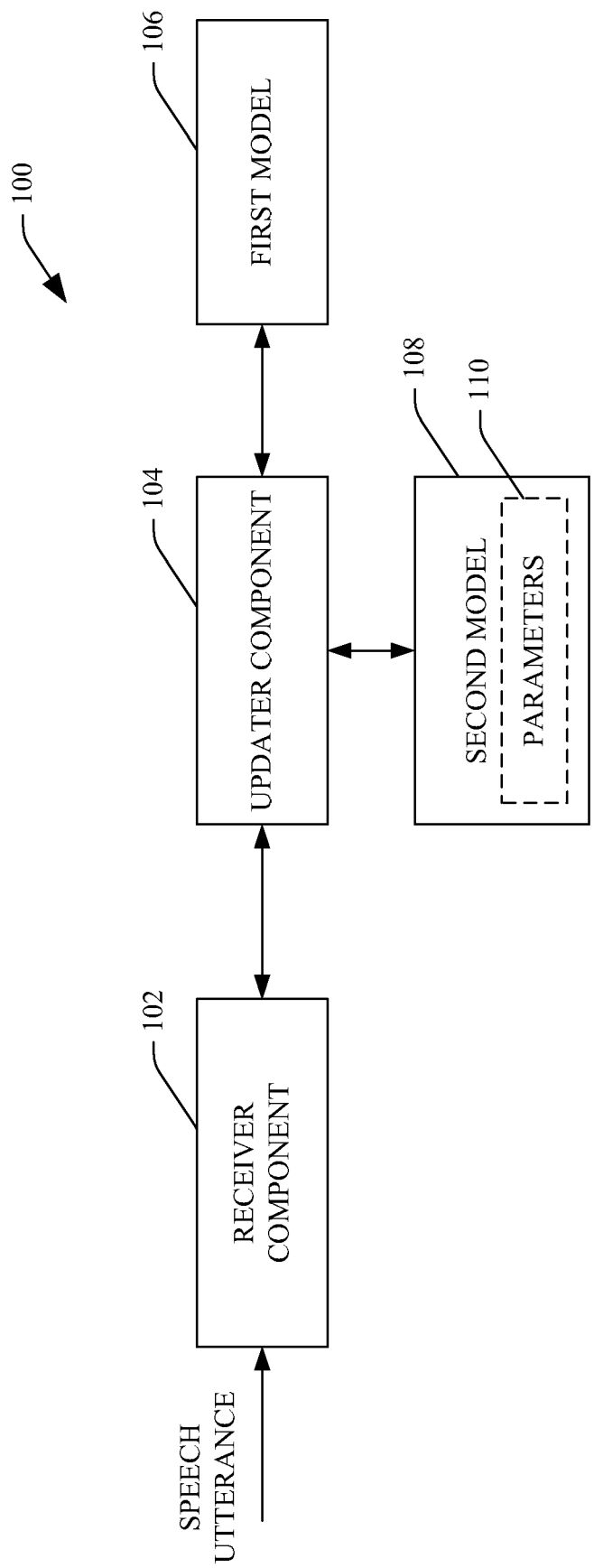
FIG. 1 is a functional block diagram of an example system that facilitates updating parameters of a model in a speech recognition system.

Various technologies pertaining to speech recognition in general, and updating parameters of a model used in connection with speech recognition in particular, will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

With reference now to FIG. 1, an example system 100 that facilitates updating parameters of a model used in connection with speech recognition is illustrated. The system 100 includes a receiver component 102 that receives a distorted speech utterance from an individual. Thus, the receiver component 102 can be in communication with a microphone or series of microphones (not shown). The distorted speech utterance can include additive and convolutive distortions, amongst other distortions. In an example, an additive distortion can be or include background noise, such as a fan running in the background, road noise from an automobile, etc. A convolutive distortion can be channel noise, such as a change in position of a microphone, an alteration from a hand-held to a hands-free microphone, or other suitable channel noise. As noted above, the distorted speech utterance can include both additive and convolutive distortions.

The system 100 can also include an updater component 104 that is in communication with a first model 106 and a second model 108, wherein the updater component 104 can automatically update parameters 110 of the second model 108 based at least in part upon estimates of multiple distortions output by the first model 106. For instance, the estimates of multiple distortions can be estimates of distortions in the speech utterance received by the receiver component 102. As noted above, the multiple distortions can include additive distortions and convolutive distortions, and the first model 106 can jointly model additive and convolutive distortions in the received speech utterance. In an example, the first model 106 can be a nonlinear phase-sensitive model. An example of the first model 106 is described in detail below. With respect to the second model 108, such second model 108 can be a Hidden Markov Model (HMM) that includes the parameters 110. Such parameters 110 can be updated by the updater component 104 based at least in part upon output of the first model 106.

The updater component 104 can perform a plurality of acts in connection with updating the parameters 110 of the second model 108. For instance, the updater component 104 can use a vector Taylor series (VTS) linearization technique to linearize the first model 106. Further, the updater component 104 can, based upon output of the linearized first model 106, estimate static and dynamic portions of distortions (both additive and convolutive) in the cepstral domain in the distorted speech utterance received by the receiver component 102. The updater component 104 can use the estimated static and dynamic portions of distortions in connection with adapting static and dynamic portions (parameters) of HMM means and variances (in the second model 108). These acts and others will be described in greater detail below.

The first model 106 and/or the second model 108 (including the updated parameters 110) can be used in connection with a speech recognition system in a plurality of environments. For instance, the first model 106 and/or second model 108 may be used in a mobile telephone, in a desktop computer, in an automobile, in connection with a customer service system, or other suitable environment.

Figure 2:
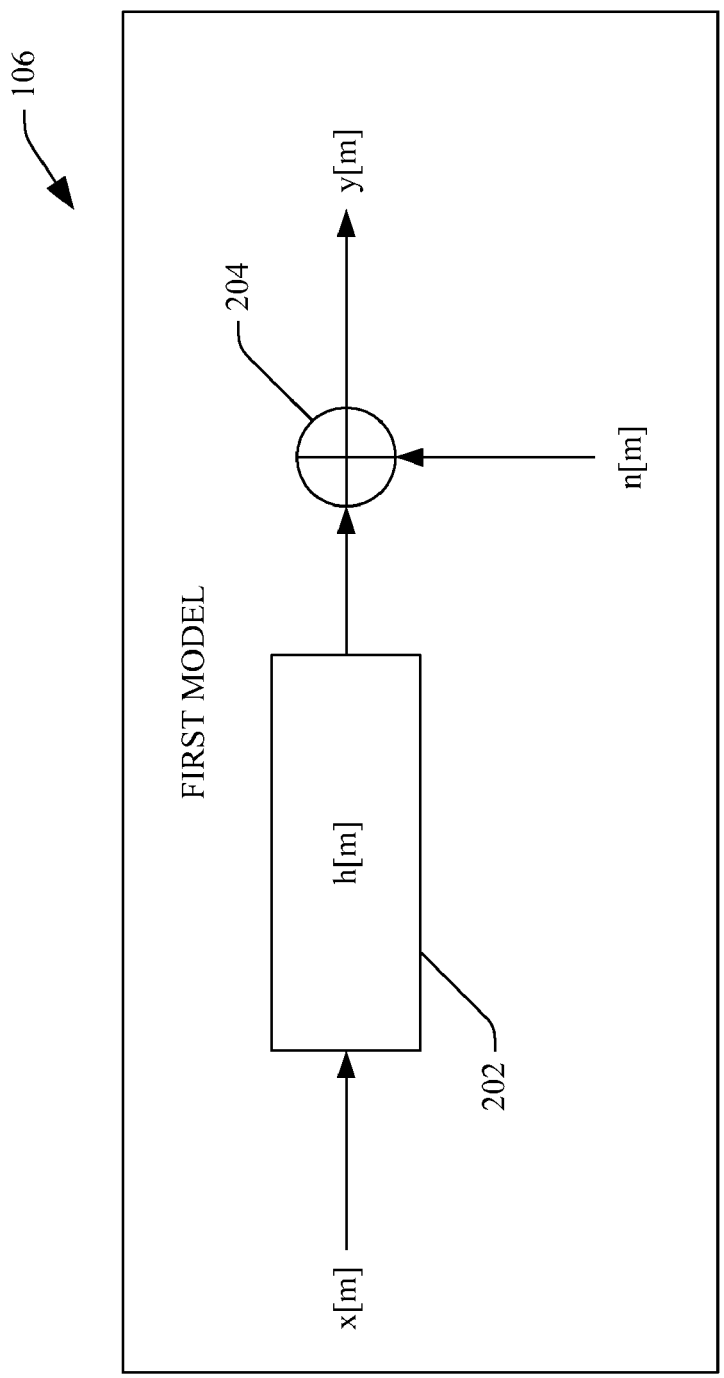
FIG. 2 is an example depiction of a model that jointly models additive and convolutive distortion in speech utterances.

With reference now to FIG. 2, an example of the first model 106, which can jointly model additive and convolutive distortions in speech utterances, is illustrated. It is to be understood, however, that any suitable model that jointly estimates additive and convolutive distortion in received speech is contemplated and is intended to fall under the scope of the hereto-appended claims. An observed, distorted speech signal y[m] can be generated from clean speech x[m] with noise n[m] and an impulse response 202 of a channel h[m] (shown by adder 204). The observed distorted speech signal can thus be written as follows:

$$y[m]=x[m]h[m]+n[m] \quad (1)$$

With discrete Fourier transformation (DFT), the following equivalent relations can be established in the frequency domain:

$$Y[k]=X[k]H[k]+N[k], \quad (2)$$

where k is a frequency-bin index in DFT given a fixed-length time window. The power spectrum of the distorted speech can then be the following:

$$|Y[k]|^2=|X[k]|^2|H[k]|^2+|N[k]|^2+2|X[k]||H[k]||N[k]|\cos\theta_k, \quad (3)$$

where $\theta_k$ denotes an (random) angle between the two complex variables N[k] and (X[k]H[k]).

By applying a set of Mel-scale filters (L in total) to the power spectrum in Equation (3), the l-th Mel filter-bank energies can be obtained for distorted speech, clean speech, additive distortion, and convolutive distortion, respectively, as follows:

$$|\tilde{Y}^{(l)}|^2 = \Sigma_k W_k^{(l)}|Y[k]|^2 \quad (4)$$

$$|\tilde{X}^{(l)}|^2 = \Sigma_k W_k^{(l)}|X[k]|^2 \quad (5)$$

$$|\tilde{N}^{(l)}|^2 = \Sigma_k W_k^{(l)}|N[k]|^2 \quad (6)$$

$$|\tilde{H}^{(l)}|^2 = \frac{\Sigma_k W_k^{(l)}|X[k]|^2|H[k]|^2}{|\tilde{X}^{(l)}|^2} \quad (7)$$

where the l-th filter can be characterized by the transfer function $$W_k^{(l)} \geq 0 (\Sigma_k W_k^{(l)}=1).$$

The phase factor $\alpha^{(l)}$ of the l-th Mel filter bank can be:

$$\alpha^{(l)} = \frac{\Sigma_k W_k^{(l)}|X[k]||H[k]||N[k]|\cos\theta_k}{|\tilde{X}^{(l)}||\tilde{H}^{(l)}||\tilde{N}^{(l)}|} \quad (8)$$

Given the above, the following relation can be obtained in the Mel filter-bank domain for the l-th Mel filter bank output:

$$|\tilde{Y}^{(l)}|^2=|\tilde{X}^{(l)}|^2|\tilde{H}^{(l)}|^2+|\tilde{N}^{(l)}|^2+2\tilde{\alpha}^{(l)}|\tilde{X}^{(l)}||\tilde{H}^{(l)}||\tilde{N}^{(l)}| \quad (9)$$

Further, a phase-factor vector for all the L Mel filter-banks can be defined as follows:

$$\alpha=[\alpha^{(1)},\alpha^{(2)},\ldots\alpha^{(l)},\ldots\alpha^{(L)}]^T \quad (10)$$

A logarithm can be taken of both sides of Equation (9) and non-square discrete cosine transform (DCT) matrix C can be multiplied to both sides of Equation (9) for all the L Mel filter banks, the following nonlinear, phase-sensitive distortion model can be obtained in the cepstral domain:

$$y=x+h+C\log(1+\exp(C^{-1}(n-x-h))+2\alpha\cdot\exp(C^{-1}(n-x-h)/2))=x+h+g_\alpha(x,h,n), \quad (11)$$

where $g_\alpha(x,h,n)=C\log(1+\exp(C^{-1}(n-x-h)+2\alpha\cdot\exp(C^{-1}(n-x-h)/2)) \quad (12)$ and $C^{-1}$ is the (pseudo) inverse DCT matrix, and y, x, n, and h are the vector-valued distorted speech, clean speech, additive distortion, and convolutive distortion, respectively, all in the Mel-frequency cepstral coefficients (MFCC) domain. The ·operation for two vectors can denote an element-wise product, and each exponentiation of a vector above may also be an element-wise operation.

Figure 3:
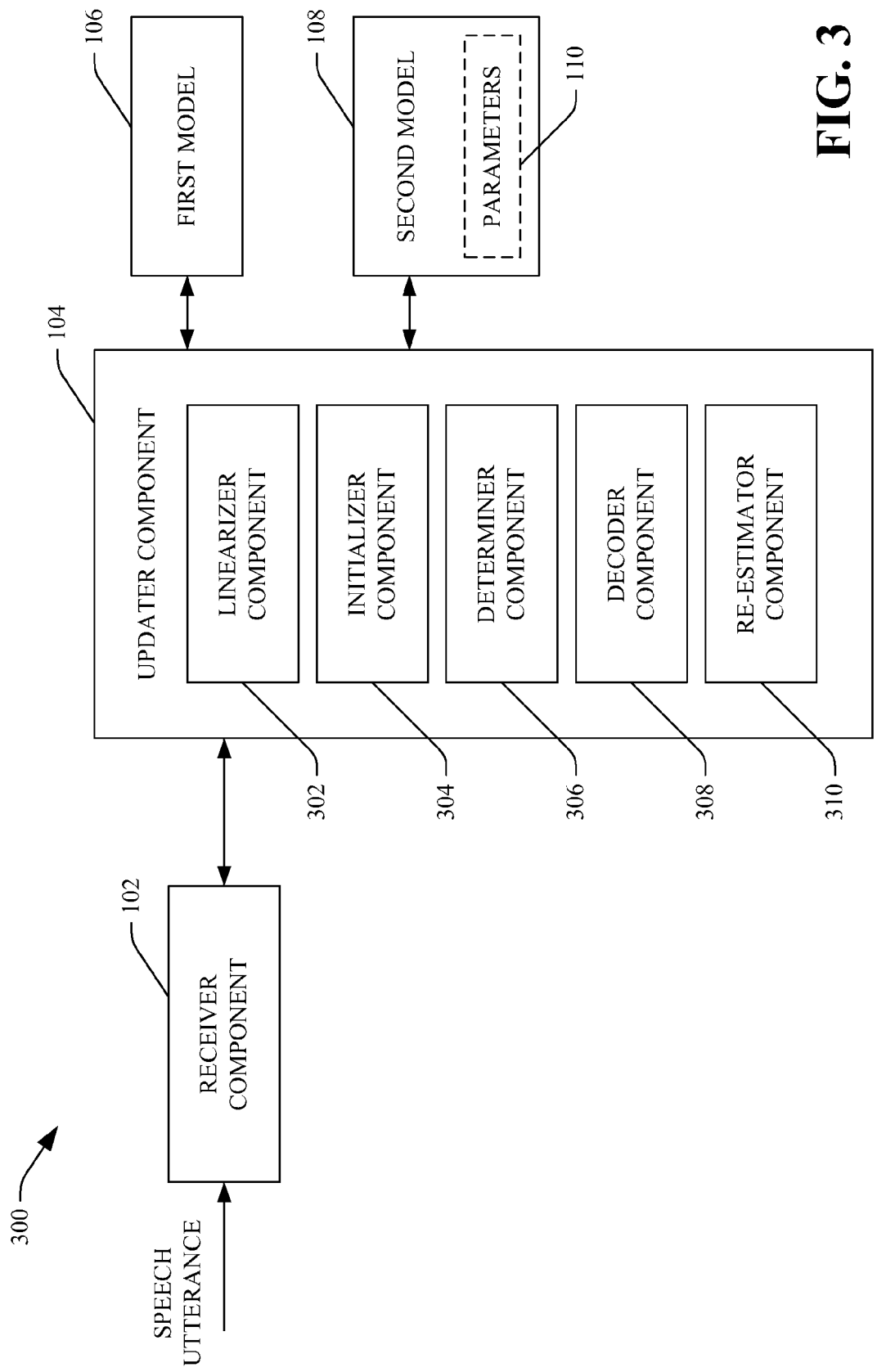
FIG. 3 is a functional block diagram of an example system that facilitates updating parameters of a model in a speech recognition system.

Referring now to FIG. 3, an example system 300 that facilitates speech recognition is illustrated. The system 300 includes the receiver component 102 that receives the distorted speech utterance. The updater component 104 can update the parameters 110 of the second model 108 based at least in part upon the received speech utterance and the first model 106. As noted and described above, the first model 106 can be a phase-sensitive joint model of additive and convolutive distortion in speech. The second model 108 may be used in connection with recognizing contents of the uttered speech.

In the example system 300, the updater component 104 is illustrated as comprising several components. It is to be understood, however, that the updater component may include more, fewer, or different components (components that perform different functionality than what is shown). For instance, the first model 106 can be a nonlinear phase-sensitive model of additive and convolutive distortions in speech, and the updater component 104 may optionally include a linearizer component 302 that can "linearize" the first model 106. Continuing with the example described with respect to FIG. 2, the linearizer component 302 can use a first-order VTS approximation with respect to x, n, and h. In an example, the linearizer component 302 can use an assumption that the phase-factor vector α is independent of x, n, and h, and the following can be obtained:

$$y \approx \mu_x + \mu_h + g(\mu_x, \mu_h, \mu_n) + G(x - \mu_x) + G(h - \mu_h) + (I - G)(n - \mu_n), \quad (13)$$

where $\frac{\partial y}{\partial x}\Big|_{\mu_x,\mu_n,\mu_h} = \frac{\partial y}{\partial h}\Big|_{\mu_x,\mu_n,\mu_h} = G,$ (14)

$$\frac{\partial y}{\partial n} = I - G, \quad (15)$$

$$G = 1 - C \operatorname{diag}\left(\frac{\exp(C^{-1}(\mu_n - \mu_x - \mu_h)) + \alpha \cdot \exp(C^{-1}(\mu_n - \mu_x - \mu_h)/2)}{1 + \exp(C^{-1}(\mu_n - \mu_x - \mu_h)) + \alpha \cdot \exp(C^{-1}(\mu_n - \mu_x - \mu_h)/2)}\right) C^{-1} \quad (16)$$

diag(.) refers to a diagonal covariance matrix with its diagonal component value being equal to the value of the vector in the argument, $\mu_n$ is an additive distortion mean vector, $\mu_h$ is a convolutive distortion mean vector, and $\mu_x$ is a clean speech mean vector. Each division of a vector can also be an element-wise operation.

The updater component 104 can further include an initializer component 304 that can initialize the convolutive distortion mean vector $\mu_h$. In an example, the initializer component 304 can initialize the convolutive distortion mean vector $\mu_h$ by setting each element of the vector to zero. Furthermore, the initializer component 304 can initialize the additive distortion mean vector $\mu_n$ using sample estimates from at least a first plurality of frames (speech-free) from the received distorted speech utterance. In addition, the initializer component 304 can also use sample estimates from a last plurality of frames from the received distorted speech utterance in connection with initializing the additive distortion mean vector $\mu_n$. Still further, the initializer component 304 can initialize the diagonal covariance matrix diag(.) by using sample estimates from the first and/or last plurality of frames from the received distorted speech utterance.

The updater component 104 can also include a determiner component 306 that can determine a first set of updates to apply to the parameters 110 of the second model 108. For instance, as noted above, the second model 108 can be a HMM. Continuing with the example above, for a given additive distortion mean vector $\mu_n$ and convolutive distortion mean vector $\mu_h$, a value of G (.) can depend on the clean speech mean vector $\mu_x$. Specifically, for the k-th Gaussian in the j-th state in the second model 108, the determiner component 306 can determine an element of the G(.) matrix as follows:

$$G_\alpha(j, k) = 1 - C \cdot \operatorname{diag}\left(\frac{\exp(C^{-1}(\mu_n \mu_{x,jk} - \mu_h)) + \alpha \cdot \exp(C^{-1}(\mu_n - \mu_{x,jk} - \mu_h)/2)}{1 + \exp(C^{-1}(\mu_n - \mu_{x,jk} - \mu_h)) + 2\alpha \cdot \exp(C^{-1}(\mu_n - \mu_{x,jk} - \mu_h)/2)}\right) \cdot C^{-1} \quad (17)$$

Thereafter, the determiner component 304 can obtain Gaussian mean vectors (the k-th Gaussian in the j-th state) of the desirably updated second model 108 by taking an expectation of both sides of Equation (13):

$$\mu_{y,jk,\alpha} \cong \mu_{x,jk} + \mu_h + g_\alpha(\mu_{x,jk}, \mu_h, \mu_n), \quad (18)$$

which can be applied only to a static portion of the MFCC vector.

The determiner component 306 can further estimate a covariance matrix $\Sigma_{y,jk,\alpha}$ in the desirably updated second model 108 by determining a weighted sum of the covariance matrix of the second model 108 (prior to the parameters 110 therein being updated ($\Sigma_{x,jk}$)) and the covariance matrix of distortion ($\Sigma_n$). In an example, the determiner component 306 can determine the covariance matrix $\Sigma_{y,jk,\alpha}$ by taking a variance operation on both sides of Equation (13) as follows:

$$\Sigma_{y,jk,\alpha} \cong G_\alpha(j,k)\Sigma_{x,jk}G_\alpha(j,k)^T + (I - G_\alpha(j,k))\Sigma_n(I - G_\alpha(j,k))^T. \quad (19)$$

The determiner component 306 may not take into consideration convolutive distortion variance as such variance can be treated as a fixed, deterministic quantity in a given utterance. The determiner component 306 may, for delta and delta/delta portions of MFCC vectors, use the following adaption formulas for the mean vector and covariance matrix in connection with updating the parameters 110 of the second model 108:

$$\mu_{\Delta y,jk,\alpha} \cong G_\alpha(j,k)\mu_{\Delta x,jk} + (I - G_\alpha(j,k))\mu_{\Delta n}, \quad (20)$$

$$\mu_{\Delta\Delta y,jk,\alpha} \cong G_\alpha(j,k)\rho_{\Delta\Delta x,jk} + (I - G_\alpha(j,k))\mu_{\Delta\Delta n} \quad (21)$$

$$\Sigma_{\Delta y,jk,\alpha} \cong G_\alpha(j,k)\Sigma_{\Delta x,jk}G_\alpha(j,k)^T + (I - G_\alpha(j,k))\Sigma_{\Delta n}(I - G_\alpha(j,k))^T \quad (22)$$

$$\Sigma_{\Delta\Delta y,jk,\alpha} \cong G_\alpha(j,k)\Sigma_{\Delta\Delta x,jk}G_\alpha(j,k)^T + (I - G_\alpha(j,k))\Sigma_{\Delta\Delta n}(I - G_\alpha(j,k))^T \quad (23)$$

The updater component 104 may further include a decoder component 308 that can decode the received speech utterance using the updated parameters 110 of the second model 108.

The updater component 104 may also include a re-estimator component 310 that can re-estimate parameters pertaining to the convolution distortion mean, static and dynamic additive noise means, and static and dynamic additive noise variances. Pursuant to an example, the re-estimator component 310 can use an expectation-maximization algorithm in connection with re-estimating the aforementioned parameters using the first order VTS approximation.

For instance, $\gamma_t(j, k)$ can denote a posterior probability for the k-th Gaussian in the j-th state of the second model 108:

$$\gamma_t(j,k) = p(\theta_t = j, \epsilon_t = k | \gamma, \overline{\lambda}), \quad (24)$$

where $\theta_t$ can denote the state index at time frame t, $\epsilon_t$ can denote the Gaussian index at time frame t, and $\overline{\lambda}$ can be previous parameter sets pertaining to additive and convolutive distortions. The re-estimator component 310 can use the following algorithms to re-estimate the convolutive distortion mean vector $\mu_h$, the static and dynamic additive distortion mean vectors $\mu_n$, $\mu_{\Delta n}$, and $\mu_{\Delta\Delta n}$, and the static and dynamic additive distortion variances $\Sigma_n$, $\Sigma_{\Delta n}$, and $\Sigma_{\Delta\Delta n}$:

$$\mu_h = \mu_{h,0} + \left\{\sum_t \sum_{j \in \Omega_s} \sum_{k \in \Omega_m} \Upsilon_t(j,k) G_\alpha(j,k)^T \Sigma_{y,jk}^{-1} G_\alpha(j,k)\right\}^{-1} \cdot \quad (25)$$

$$\left\{\sum_t \sum_{j \in \Omega_s} \sum_{k \in \Omega_m} \Upsilon_t(jk) G_\alpha(jk)^T \Sigma_{y,jk}^{-1}\left[\begin{array}{c} y_t - \mu_{x,jk} - \mu_{h,0} - \\ g_\alpha(\mu_{x,jk}, \mu_{h,0}, \mu_{n,0}) \end{array}\right]\right\}$$

-continued $$\mu_n = \mu_{n,0} + \left\{ \sum_t \sum_{j \in \Omega_s} \sum_{k \in \Omega_m} \Upsilon_t(j,k) \atop (I - G_\alpha(j,k))^T \Sigma_{y,jk,\alpha}^{-1} (I - G_\alpha(j,k)) \right\}^{-1} \quad (26)$$

$$\left\{ \sum_t \sum_{j \in \Omega_s} \sum_{k \in \Omega_m} \Upsilon_t(jk) \atop (I - G_\alpha(jk))^T \Sigma_{yjk\alpha}^{-1} \left[ \begin{array}{c} y_t - \mu_{x,jk} - \mu_{h,0} - \\ g\alpha(\mu_{x,jk},\mu_{h,0},\mu_{n,0}) \end{array} \right] \right\}$$

$$\mu_{\Delta n} = \mu_{\Delta n,0} + \left\{ \sum_t \sum_{j \in \Omega_s} \sum_{k \in \Omega_m} \Upsilon_t(j,k) \atop (I - G_\alpha(j,k))^T \Sigma_{\Delta y,jk}^{-1} (I - G_\alpha(j,k)) \right\}^{-1} \quad (27)$$

$$\left\{ \sum_t \sum_{j \in \Omega_s} \sum_{k \in \Omega_m} \Upsilon_t(jk)(I - G_\alpha(jk))^T \Sigma_{\Delta yjk\alpha}^{-1} \left[ \begin{array}{c} \Delta y_t - G\mu_{\Delta x,jk} - \\ (I - G_\alpha)\mu_{\Delta n,0} \end{array} \right] \right\}$$

$$\mu_{\Delta\Delta n} = \mu_{\Delta\Delta n,0} + \left\{ \sum_t \sum_{j \in \Omega_s} \sum_{k \in \Omega_m} \Upsilon_t(j,k) \atop (I - G_\alpha(j,k))^T \Sigma_{\Delta\Delta y,jk}^{-1} (I - G_\alpha(j,k)) \right\}^{-1} \quad (28)$$

$$\left\{ \sum_t \sum_{j \in \Omega_s} \sum_{k \in \Omega_m} \Upsilon_t(jk) \atop (I - G_\alpha(jk))^T \Sigma_{\Delta\Delta y,jk}^{-1} \left[ \begin{array}{c} \Delta\Delta y_t - G\mu_{\Delta\Delta x,jk} - \\ (I - G_\alpha)\mu_{\Delta\Delta n,0} \end{array} \right] \right\}$$

$$\Sigma_n = \Sigma_{n,0} - \left( \frac{\partial^2 Q}{\partial^2 \Sigma_n} \right)_{\Sigma_n = \Sigma_{n,0}}^{-1} \left( \frac{\partial Q}{\partial \Sigma_n} \right)_{\Sigma_n = \Sigma_{n,0}} \quad (29)$$

The re-estimator component 310 can update $\Sigma_{\Delta n}$ and $\Sigma_{\Delta\Delta n}$ in a similar manner as shown in Equation (29) by replacing static parameters with corresponding delta and delta/delta parameters.

The determiner component 306 can then use the parameters re-estimated by the re-estimator component 310 to compute G(.) (e.g., using Equation (17)) and can generate a second set of updates used to update/adapt the parameters 110 of the second model 108, for instance, through use of Equations (18)-(23). The second model 108 (including updates to the parameters 110) can be used in connection with recognizing speech in the received speech utterance. Furthermore, it is to be understood that re-estimation and determining updated parameters may be an iterative process.

In addition to compensating for distortions such as convolutive and additive distortions (which are stationary), other sources of distortions and possibly nonstationary sources can also be estimated in a similar fashion and be used to update the parameters 110 of the second model 108.

With reference now to FIGS. 4-7, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like.

Figure 4:
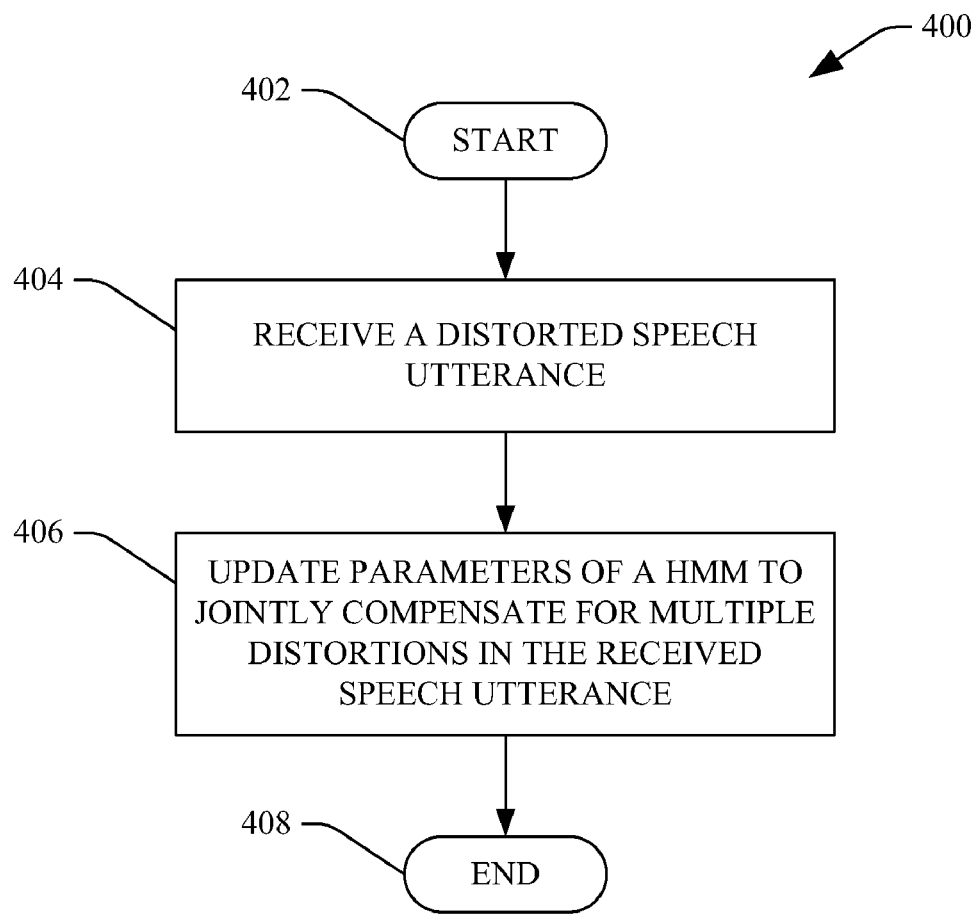
FIG. 4 is a flow diagram that illustrates an example methodology for updating parameters of a model for use in a speech recognition system.

Referring now to FIG. 4, an example methodology 400 for updating parameters of a Hidden Markov Model used in connection with speech recognition is illustrated. The methodology 400 starts at 402, and at 404 a distorted speech utterance is received. For instance, a microphone in a computer, a mobile device, an automobile, and/or the like can be used in connection with receiving the distorted speech utterance. Furthermore, the received speech utterance may include multiple distortions, such as additive and convolutive distortions.

At 406, parameters of a HMM that can be used in connection with performing speech recognition tasks are updated to jointly compensate for the multiple distortions in the received speech utterance. The methodology 400 completes at 408.

Figure 5:
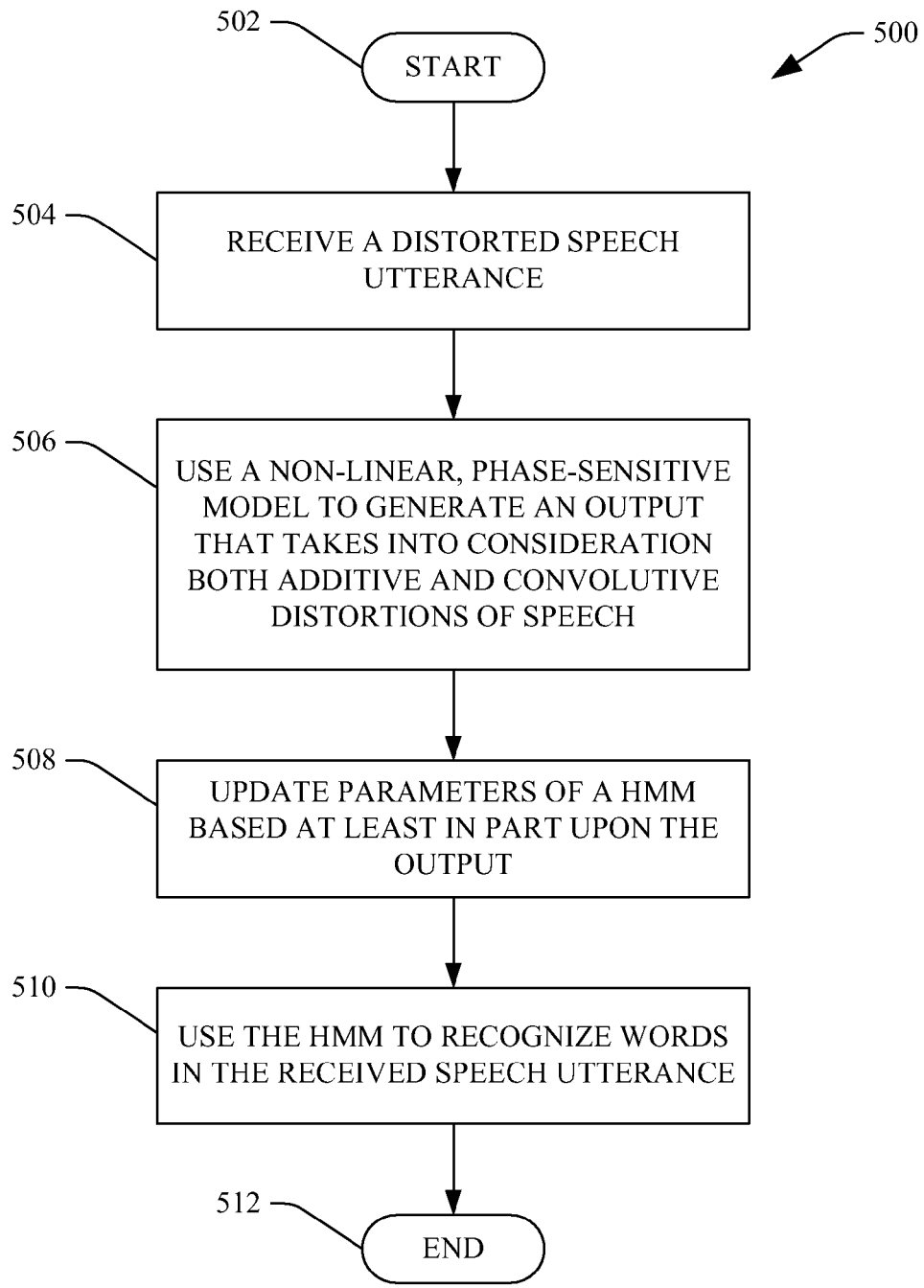
FIG. 5 is a flow diagram that illustrates an example methodology for using an updated model to recognize at least one work in a received speech utterance.

Now referring to FIG. 5, an example methodology 500 for updating parameters of an HMM is illustrated. The methodology 500 starts at 502, and at 504 a distorted speech utterance is received, wherein the distorted speech utterance can include both additive and convolutive distortions.

At 506, a non-linear, phase-sensitive model is used to generate an output that takes into consideration both additive and convolutive distortions in speech. At 508, parameters of a HUMM are updated based at least in part upon the output generated at 506.

At 510, the HMM (with the updated parameters) is used to recognize at least one word in the received speech utterance. The methodology 500 completes at 512.

Figure 6:
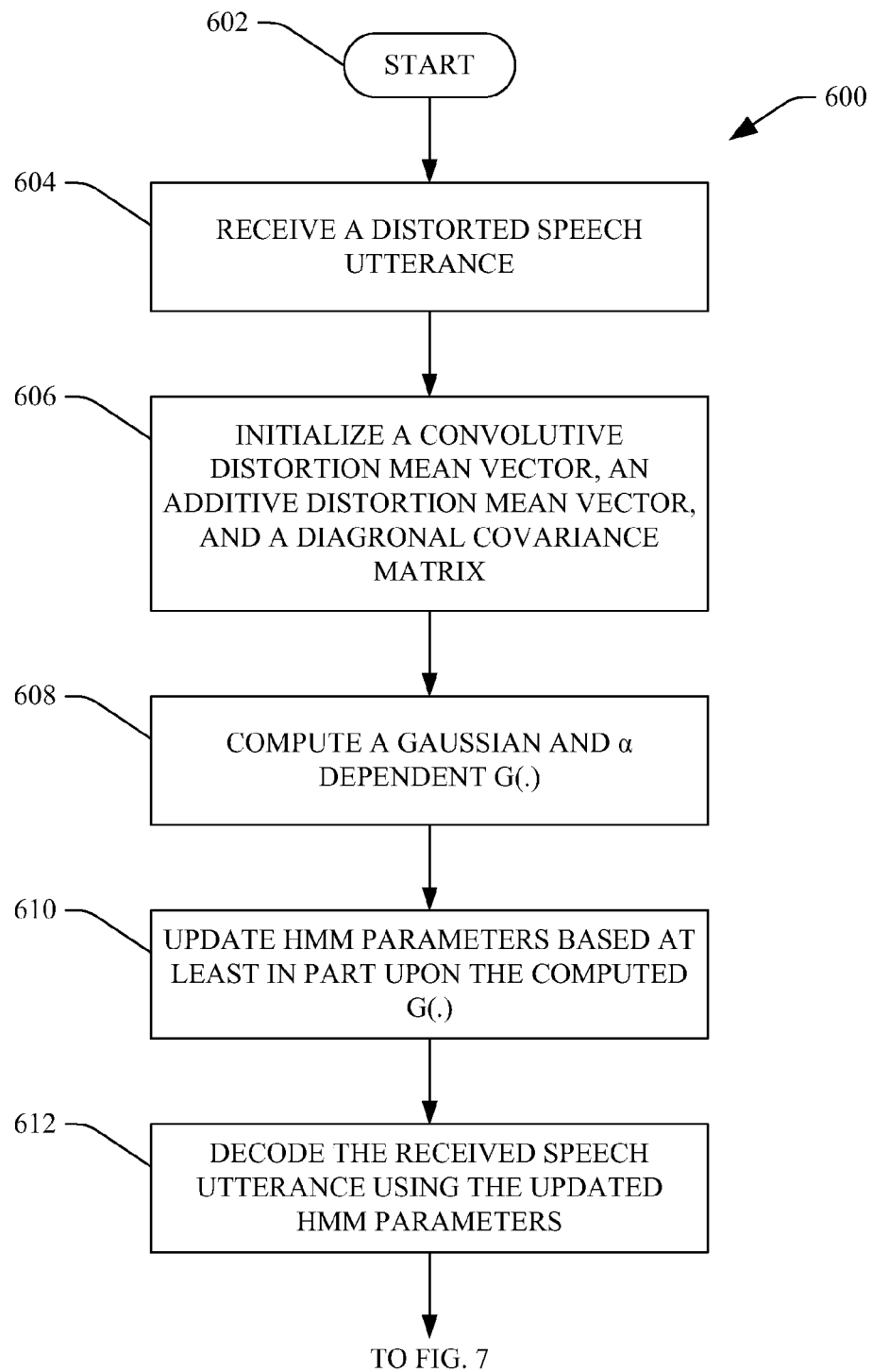
FIGS. 6 and 7 depict a flow diagram that illustrates an example methodology for updating parameters of a model for use in a speech recognition system.
Figure 7:
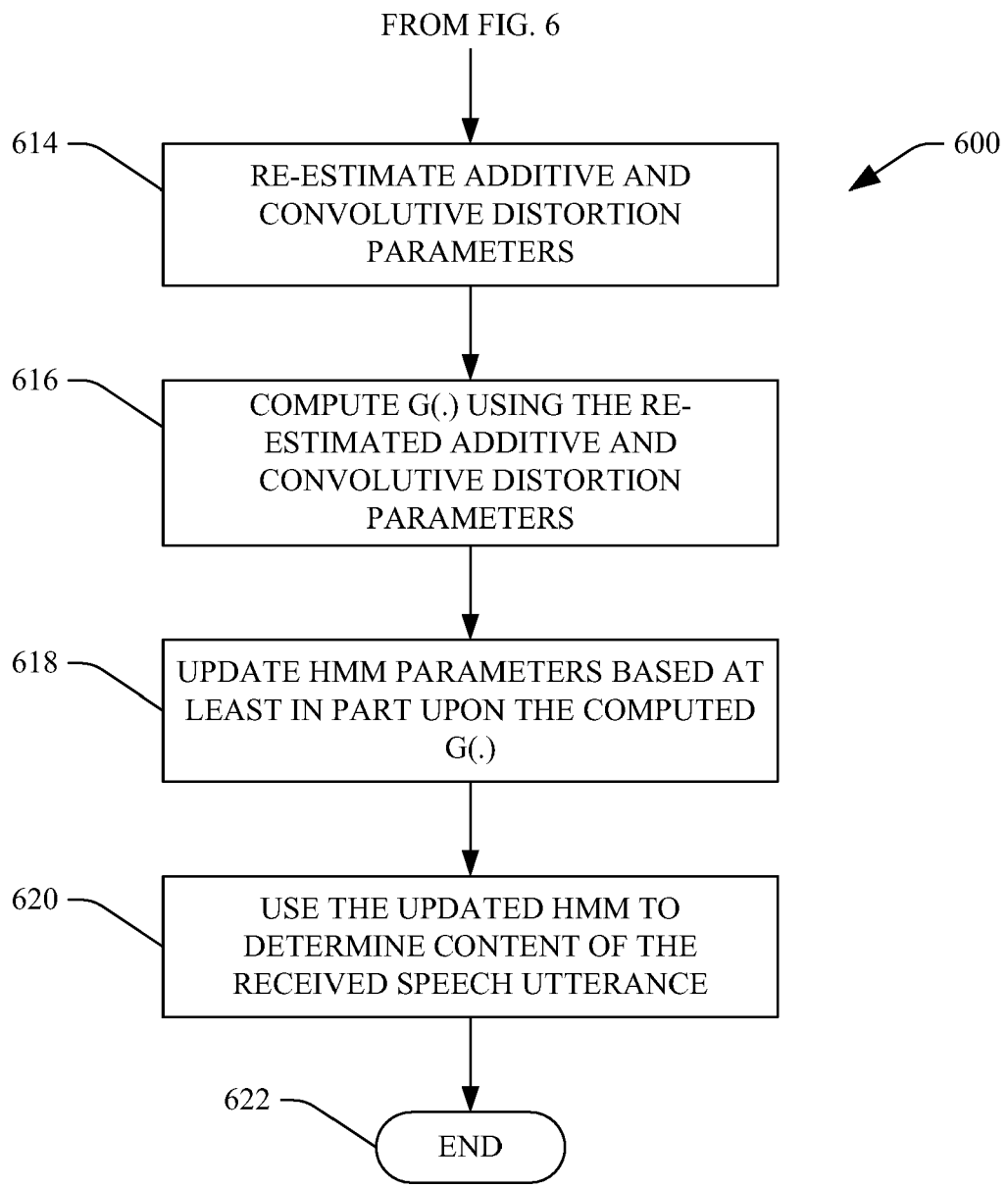

With reference now to FIGS. 6 and 7, an example methodology 600 for determining content of uttered speech is illustrated. The methodology 600 starts at 602, and at 604 a distorted speech utterance is received (e.g., by way of one or more microphones). At 606, a convolutive distortion mean vector, an additive distortion mean vector, and a diagonal covariance matrix are initialized. For instance, the convolutive distortion mean vector can be set to include all zeros. In another example, the additive distortion mean vector and the diagonal covariance matrix can be initialized using at least one sample estimate from at least a first frame of a received speech utterance.

At 608, a Gaussian and a dependent G(.) can be computed, for instance, using Equation (17) above. For example, a can be selected using any suitable technique, including random selection within a pre-defined range. At 610, parameters of a HMM are updated based at least in part upon the computed G(.). In an example, Equations (18)-(23) can be used in connection with updating the parameters of the HMM.

At 612, the received speech utterance is decoded using the updated HMM parameters. Any suitable decoding technique can be used in connection with decoding the received speech utterance. At 614, the additive and convolutive distortion mean vectors are re-estimated based at least in part upon the decoded speech utterance (decoded at 612). For instance, equations (24)-(29) can be used in connection with re-estimating the additive and convolutive distortion mean vectors.

At 616, G(.) can be computed using the re-estimated additive and convolutive distortion mean vectors. For instance, equation (17) can be used to compute G(.). In an example, acts 612 through 616 can be repeated numerous times prior to proceeding to act 618. In yet another example, acts 614 and 616 can be repeated numerous times prior to proceeding to act 618.

At 618, the HMM parameters are updated based at least in part upon the G(.) computed at 616. At 620, the updated HMM is used to determine content of the received speech utterance (e.g., to determine at least one word in the received speech utterance). The methodology 600 completes at 622.

Figure 8:
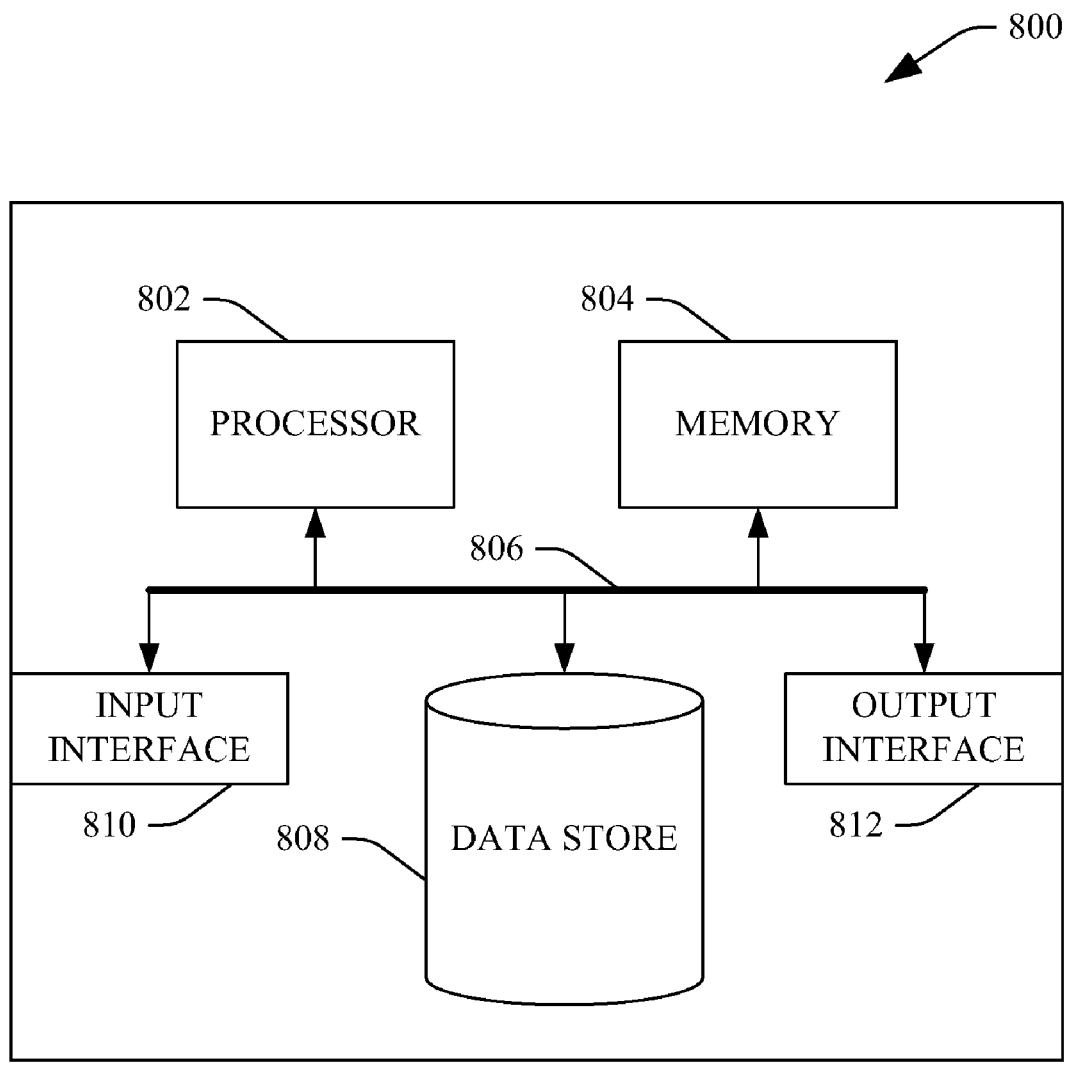
FIG. 8 is an example computing system.

Now referring to FIG. 8, a high-level illustration of an example computing device 800 that can be used in accordance with the systems and methodologies disclosed herein is illustrated. For instance, the computing device 800 may be used in a system that can be used to update parameters of a HMM and/or used to perform speech recognition tasks. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store data pertaining to a speech, such as additive and convolutive distortion parameters, etc.

The computing device 800 additionally includes a data store 808 that is accessible by the processor 802 by way of the system bus 806. The data store 808 may include executable instructions, data pertaining to speech recognition, etc. The computing device 800 also includes an input interface 810 that allows external devices to communicate with the computing device 800. For instance, the input interface 810 may be used to receive instructions from an external computer device, receive speech utterances from user, etc. The computing device 800 also includes an output interface 812 that interfaces the computing device 800 with one or more external devices. For example, the computing device 800 may transmit data to a display device by way of the output interface 812.

Additionally, while illustrated as a single system, it is to be understood that the computing device 800 may be a distributed system. Thus, for instance, several devices may be in communication by way of a network connection and may collectively perform tasks described as being performed by the computing device 800.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A speech recognition system, comprising:
   a receiver component that receives a distorted speech utterance, the distorted speech utterance comprising additive distortions and convolutive distortions; and
   an updater component that is in communication with a first model and a second model, the first model being a nonlinear phase-sensitive model of additive and convolutive distortions in distorted speech utterances, the first model jointly outputting estimates of the additive distortions and the convolutive distortions in the distorted speech utterance received by the receiver component, wherein the updater component automatically updates parameters of the second model based at least in part upon the estimates of the additive distortions and the convolutive distortions output by the first model, wherein the second model is a Hidden Markov Model, wherein subsequent to the updater component updating the parameters of the second model, the second model outputs data that is indicative of a word in the distorted speech utterance, and wherein at least one computing task is performed based at least in part upon the data that is indicative of the word in the distorted speech utterance.

2. The speech recognition system of claim 1, wherein the updater component estimates static and dynamic portions of additive and convolutive distortions in a cepstral domain in the distorted speech utterance received by the receiver component based upon output of the first model in connection with updating the parameters of the second model.

3. The speech recognition system of claim 1, wherein the first model outputs values for vector-valued distorted speech, clean speech, additive distortion, and convolutive distortion, and further comprising a linearizer component that outputs first-order vector Taylor Series approximations for the vector-valued distorted speech, the clean speech, the additive distortion, and the convolutive distortion, and wherein the updater component updates the parameters of the second model based at least in part upon the output approximations.

4. The speech recognition system of claim 3, further comprising an initializer component that can initialize a convolutive distortion mean vector by setting each element of the convolutive distortion mean vector to zero, wherein the updater component updates the parameters of the second model based at least in part upon the convolutive distortion mean vector.

5. The speech recognition system of claim 4, wherein the initializer component initializes an additive distortion mean vector using sample estimates from at least a first plurality of frames from the received distorted speech utterance, wherein the updater component updates the parameters of the second model based at least in part upon the additive distortion mean vector.

6. The speech recognition system of claim 5, wherein the initializer component initializes a diagonal covariance matrix by using the sample estimates from the first plurality of frames from the received distorted speech utterance, wherein the updater component updates the parameters of the second model based at least in part upon the diagonal covariance matrix.

7. The speech recognition system of claim 6, further comprising a determiner component that determines a first set of updates to apply to the parameters of the second model, and also determines a second set of updates to apply to the parameters of the second model, wherein the second set of updates is based at least in part upon the first set of updates.

8. The speech recognition system of claim 7, further comprising a decoder component that decodes the received speech utterance based at least in part upon the first set of updates determined by the determiner component.

9. The speech recognition system of claim 8, further comprising a re-estimator component that re-estimates parameters pertaining to a convolution distortion mean, a static additive noise mean, a dynamic additive noise mean, a static additive distortion variance, and a dynamic additive distortion variance, wherein the second set of updates determined by the determiner component is based at least in part upon the re-estimated parameters.

10. The speech recognition system of claim 1, the first model being represented as follows:

$$y = x + h + C\log\left(1 + \exp(C^{-1}(n-x-h)) + 2\alpha \cdot \exp\left(\frac{C^{-1}(n-x-h)}{2}\right)\right) =$$
$$x + h + g_\alpha(x, h, n),$$

where $g_\alpha(x, h, n) = C \log(1+\exp(C^{-1}(n-x-h)+2\alpha\cdot\exp(C^{-1}(n-x-h)/2))$, where y, x, n, and h are vector-valued distorted speech, clean speech, additive distortion, and convolutive distortion in the received speech utterance, respectively;
C is a non-square discrete cosine transform (DCT) matrix; $C^{-1}$ is an inverse DCT matrix; and
$\alpha = [\alpha^{(1)}, \alpha^{(2)}, \ldots \alpha^{(l)}, \ldots \alpha^{(L)}]^T$ is a phase-factor vector for L Mel filter banks.

11. The speech recognition system of claim 1 comprised by a mobile computing device.

12. The speech recognition system of claim 11, the mobile computing device being a mobile telephone.

13. A method comprising the following computer-executable acts:
receiving a distorted speech utterance, the distorted speech utterance comprising additive distortion and convolutive distortion;
utilizing a first model to jointly output estimates of the additive distortion and the convolutive distortion, the first model being a nonlinear phase-sensitive model that jointly models additive distortion and convolutive distortion in speech utterances;
updating parameters of a Hidden Markov Model based at least in part upon the estimates of the additive distortion and the convolutive distortion in the speech utterance;
utilizing the Hidden Markov Model with updated parameters to recognize at least one word in the received speech utterance; and
performing a computing task responsive to the at least one word in the received speech utterance being recognized.

14. The method of claim 13, further comprising:
initializing a convolutive distortion mean vector, an additive distortion mean vector, and a diagonal covariance matrix; and
updating the parameters of the Hidden Markov Model based at least in part upon the initialized convolutive distortion mean vector, the additive distortion mean vector, and the diagonal covariance matrix.

15. The method of claim 14, wherein initializing the convolutive distortion mean vector comprises setting all elements of the convolutive distortion mean vector to zero.

16. The method of claim 13, further comprising linearizing output of a first model using a vector Taylor series first order approximation.

17. The method of claim 13, the first model being represented as follows:

$$y = x + h + C\log\left(1 + \exp(C^{-1}(n-x-h)) + 2\alpha \cdot \exp\left(\frac{C^{-1}(n-x-h)}{2}\right)\right) =$$
$$x + h + g_\alpha(x, h, n),$$

where $g_\alpha(x, h, n) = C \log(1+\exp(C^{-1}(n-x-h)+2\alpha\cdot\exp(C^{-1}(n-x-h)/2))$, where y, x, n, and h are vector-valued distorted speech, clean speech, additive distortion, and convolutive distortion in the received speech utterance, respectively;
C is non-square discrete cosine transform (DCT) matrix; $C^{-1}$ is an inverse DCT matrix; and
$\alpha = [\alpha^{(1)}, \alpha^{(2)}, \ldots \alpha^{(l)}, \ldots \alpha^{(L)}]^T$ is a phase-factor vector for L Mel filter banks.

18. The method of claim 17, further comprising re-estimating the additive distortion and the convolutive distortion in the speech utterance prior to updating the parameters of the Hidden Markov Model.

19. A computer-readable data storage device comprising instructions that, when executed by a processor, cause the processor to perform acts comprising:
a) receiving a distorted speech utterance;
b) initializing a convolutive distortion mean vector, an additive distortion mean vector, and a diagonal covariance matrix;
c) updating parameters of a Hidden Markov Model used in connection with speech recognition based at least in part upon the convolutive distortion mean vector, the additive distortion mean vector, and the diagonal covariance matrix;
d) decoding the received speech utterance using parameters of the Hidden Markov Model updated in act c);
e) re-estimating the additive distortion mean vector and the convolutive distortion mean vector;
f) utilizing a first model, jointly estimating multiple distortions in the distorted speech utterance based at least in part upon the additive distortion mean vector and the convolutive distortion mean vector re-estimated in e), wherein the first model is a phase-sensitive non-linear model;
g) update updating the parameters of the Hidden Markov Model based at least in part upon the multiple distortions jointly estimated in f); and
h) determining content of the received speech utterance through use of the Hidden Markov Model and the updated parameters of act g).

* * * * *